United States Patent [19]

Nakanishi

[11] Patent Number: 5,233,490
[45] Date of Patent: Aug. 3, 1993

[54] CASSETTE HOLDER MOUNTING

[75] Inventor: Yasuyuki Nakanishi, Hyogo, Japan

[73] Assignee: Mitsubishi Denki Kabushiki Kaisha, Tokyo, Japan

[21] Appl. No.: 507,913

[22] Filed: Apr. 12, 1990

[30] Foreign Application Priority Data

Apr. 13, 1989 [JP] Japan .................................. 1-91861

[51] Int. Cl.⁵ ..................... G11B 5/008; G11B 15/60; G11B 17/04
[52] U.S. Cl. .................. 360/96.5; 360/99.06
[58] Field of Search ................ 360/96.5, 96.6, 99.02, 360/99.06

[56] References Cited

U.S. PATENT DOCUMENTS

| 4,723,185 | 2/1988 | Maeda | 360/96.5 |
| 4,734,800 | 3/1988 | Suzuki | 360/85 |
| 4,757,400 | 7/1988 | Park | 360/96.5 |
| 4,785,364 | 11/1988 | Ando et al. | 360/96.5 |
| 4,825,312 | 4/1989 | Yoshikawa et al. | 360/96.5 |

FOREIGN PATENT DOCUMENTS 4011471 10/1990 Fed. Rep. of Germany .
62-94440 6/1987 Japan .
63-29246 2/1988 Japan .

Primary Examiner—Stuart S. Levy
Assistant Examiner—Jefferson Evans
Attorney, Agent, or Firm—Burns, Doane, Swecker & Mathis

[57] ABSTRACT

A cassette loading apparatus includes a frame having a U-shaped cross section and having opposed side walls which are formed with guiding slots therein. A cassette holder is movably mounted to the frame through guiding pins which project outwardly from side walls of the cassette holder and which extend into the guiding slots. The cassette holder thus moves between a first position and a second position while holding a cassette therein. The guiding slots are formed such that the guiding pins are guided into the guiding slots when the cassette holder is assembled into the frame. At least one of the side walls of the frame has a bent portion at an free edge thereof. The bent portion is bent outwardly from the side wall and spans the entire length of the side wall of the frame. The guiding slots in the side walls of the frame extend into portions intermediate of the bent portions, whereby the guiding pins are guided into the guiding slots when the cassette holder is assembled into the frame.

5 Claims, 3 Drawing Sheets

FIG. 4-PRIOR ART
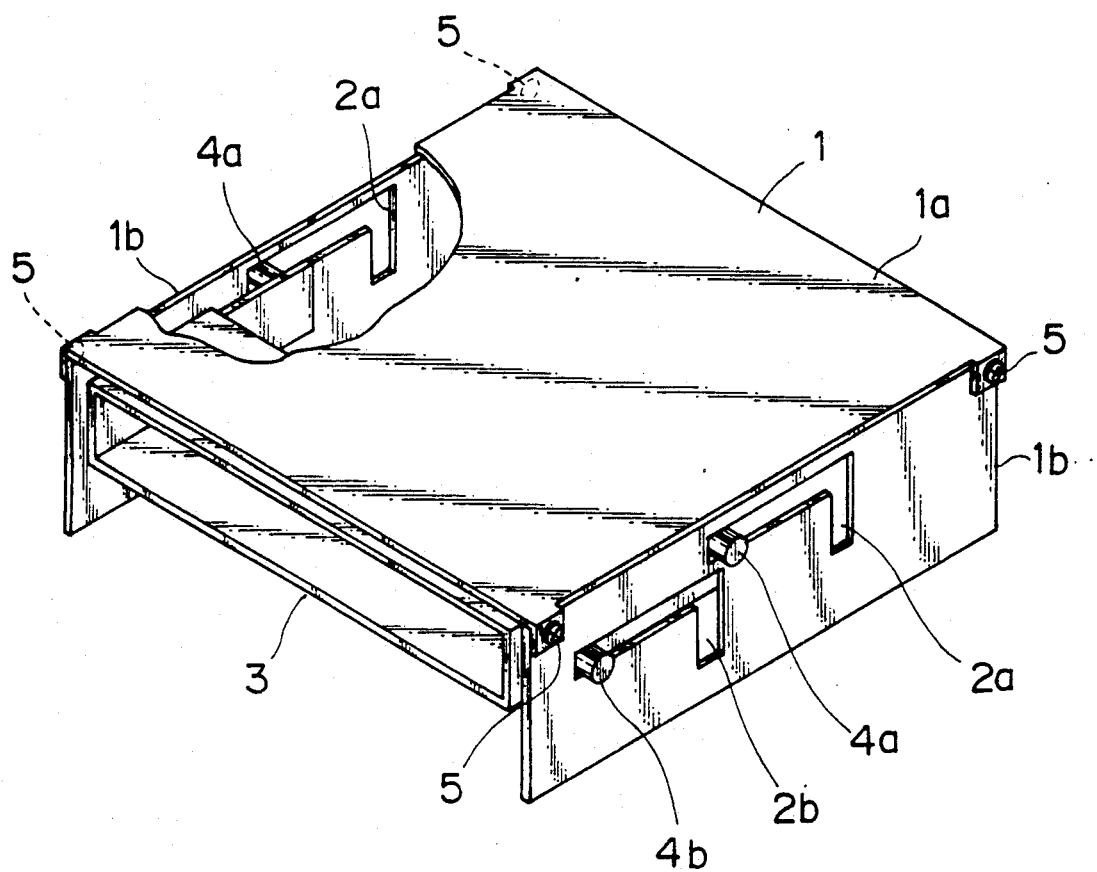
FIG. 5-PRIOR ART
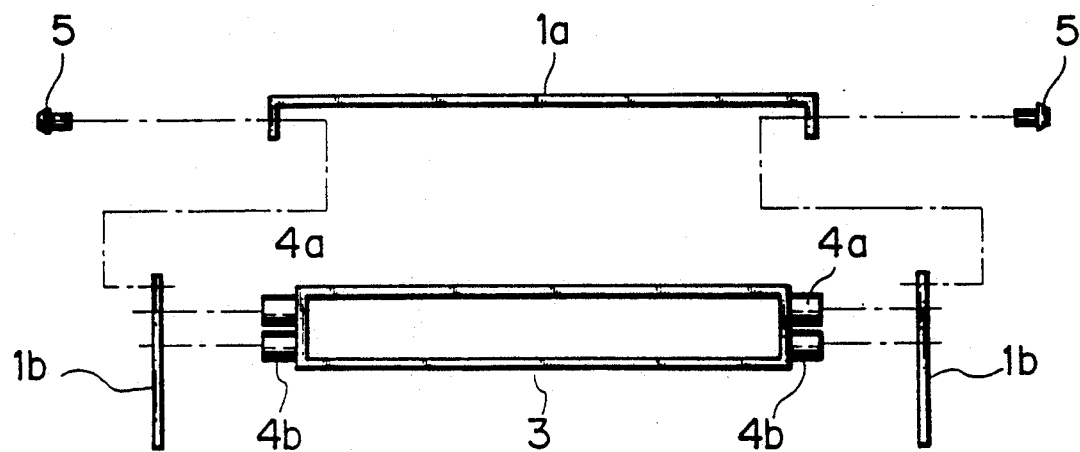

CASSETTE HOLDER MOUNTING

BACKGROUND OF THE INVENTION

1. Field of the Invention

The present invention relates to a cassette loading apparatus mounted within a frame which is provided with a cassette holder which moves between a cassette inserting position and a cassette loading position while holding a cassette therein.

2. Prior Art

FIG. 4 is a perspective view showing a prior art cassette loading apparatus used in a digital audio tape recorder (DAT). A frame 1 is formed of a top frame 1a and two side frames or walls 1b and is generally U-shaped in cross section. The side frames are secured to the top frame 1a by means of bolts 5. The respective side frames are formed with an L-shaped first and second guiding slots 2a and 2b therein. A cassette holder 3 holds a cassette therein and is moved by a drive source (not shown) between a cassette-inserting position and a cassette-loading position, being guided in the first and second guiding slots 2a and 2b by a first and second guiding pins 4a and 4b which project from each side of the cassette holder 3 into the guiding slots 2a and 2b.

The cassette is first inserted into the cassette holder 3 which holds the cassette therein. Then, the cassette holder 3 is moved by the drive source, the guiding pins 4a and 4b are moved in the L-shaped guiding slots from the cassette inserting position to the cassette-loading position, then a positioning post engages a positioning recess (not shown) and reel shafts advance into the reel holes formed in the cassette, whereby the cassette is loaded at the cassette loading position.

With the aforementioned prior art apparatus, the cassette holder 3 is assembled into the frame 1 in a procedure shown in FIG. 5. The first and second guiding pins 4a and 4b are inserted into the guiding slots 2a and 2b while at the same time the top frame 1a and the two side frames 1b are assembled together by means of the bolts 5 for an integral construction. However, this procedure is time-consuming and requires a skillful worker.

SUMMARY OF THE INVENTION

An object of the invention is to provide a cassette loading apparatus which has a greatly improved assembly efficiency.

A cassette loading apparatus according to the invention includes a frame having a U-shaped cross section and having opposed side walls which are formed with guiding slots therein. A cassette holder is movable mounted to the frame through guiding pins which project outwardly from side walls of the cassette holder and which extend into the guiding slots. The cassette holder thus repeatedly moves between a first position and a second position while holding a cassette therein. The guiding slots are formed such that the guiding pins are guided into the guiding slots when the cassette holder is assembled into the frame. At least one of the side walls of the frame has a bent portion at an free edge thereof. The bent portion is bent outwardly from the side walls and spans the entire length of the side wall of the frame. The guiding slots in the side walls of the frame extend into portions intermediate of the bent portions, whereby the guiding pins are guided into the guiding slots when the cassette holder is assembled into the frame.

BRIEF DESCRIPTION OF THE DRAWINGS

Features and other objects of the invention will be apparent from the description of the preferred embodiments with reference to the accompanying drawings in which:

FIG. 4 is a perspective view showing a prior art cassette loading apparatus used in a digital audio tape recorder (DAT); and FIG. 5 illustrates how the prior art cassette loading apparatus in FIG. 4 is assembled.

DESCRIPTION OF THE PREFERRED EMBODIMENTS

Figure 1:
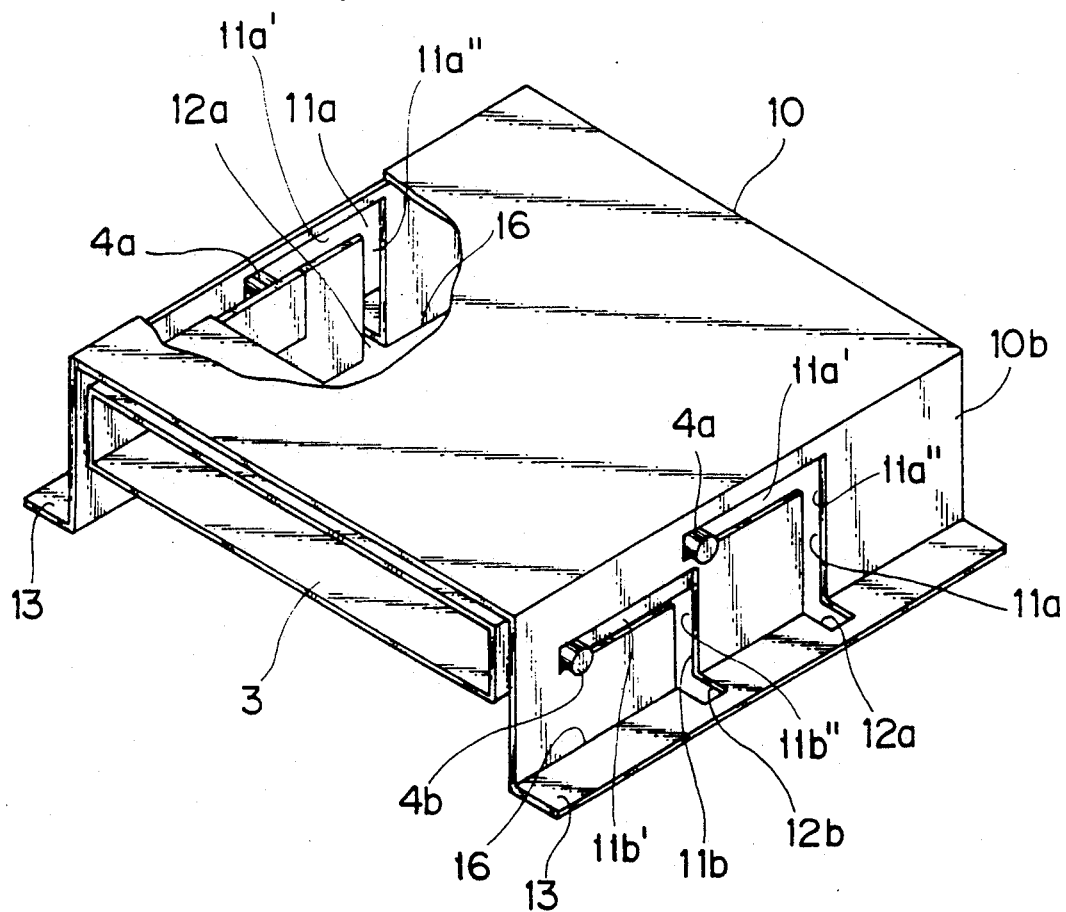
FIG. 1 is a perspective view showing a first embodiment of the present invention.

A first embodiment of the invention will be described with reference to FIG. 1. Elements similar to those in FIG. 4 have been given similar reference numerals, and the detailed descriptions thereof have been omitted.

Figure 2:
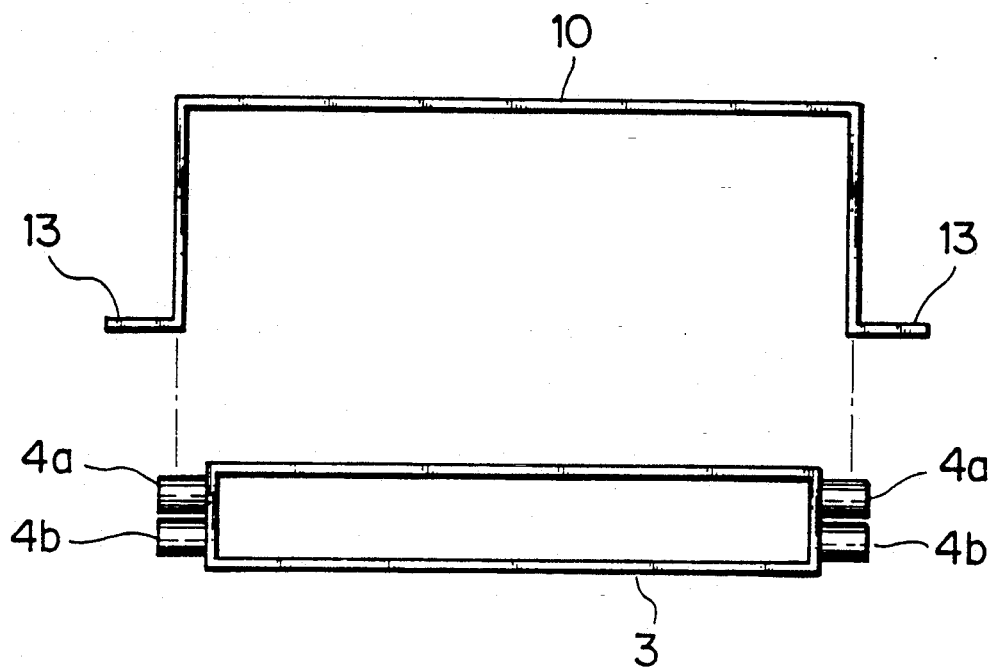
FIG. 2 illustrates how the cassette loading apparatus according to the first embodiment is assembled.

A frame 10 is formed integrally continuous by press, and has a U-shaped cross section. The frame 10 is formed with first and second guiding slots 11a and 11b in opposed side walls 10b, each of which is provided with outwardly bent portions 13. As can be seen from FIG. 1, the guiding slots 11a, 11b include generally horizontal slot legs 11a', 11b', and generally vertical slot legs 11a", 11b" which extend downwardly in FIG. 1 from the horizontal slot legs 11a', 11b' to edges 16 of the side walls 10b. The bent portions are formed with a first and a second disengaging slot 12a and 12b therein which are continuous with the vertical slot legs 11a", 11b" of the guiding slots 11a and 11b. The bent portion 13 serves to reinforce the side wall 10b and therefore it extends across the entire length of the side wall 10b, though the bent portion 13 may be constricted to just the end of the disengaging slots 11a and 11b. When the cassette holder of the above described construction is to be assembled into the frame 10, as shown in FIG. 2, the cassette holder 3 is first inserted into the frame 10 through the disengaging slots 12a and 12b. Then, the cassette holder 3 is mounted to the frame 10 by means of a retaining member of a well known construction, completing the assembly. In FIG. 1, the cassette holder 3 is at the cassette inserting position. The guiding pins 4a and 4b of the cassette holder 3 are driven towards the vertical slot portions of the L-shaped guiding slots 11a and 11b until the guiding pins 4a and 4b fall in the vertical slot portions. The cassette holder is supported at an intermediate portion of the vertical slot portions, which is the cassette loading apparatus, by a supporting member of a known construction.

Figure 3:
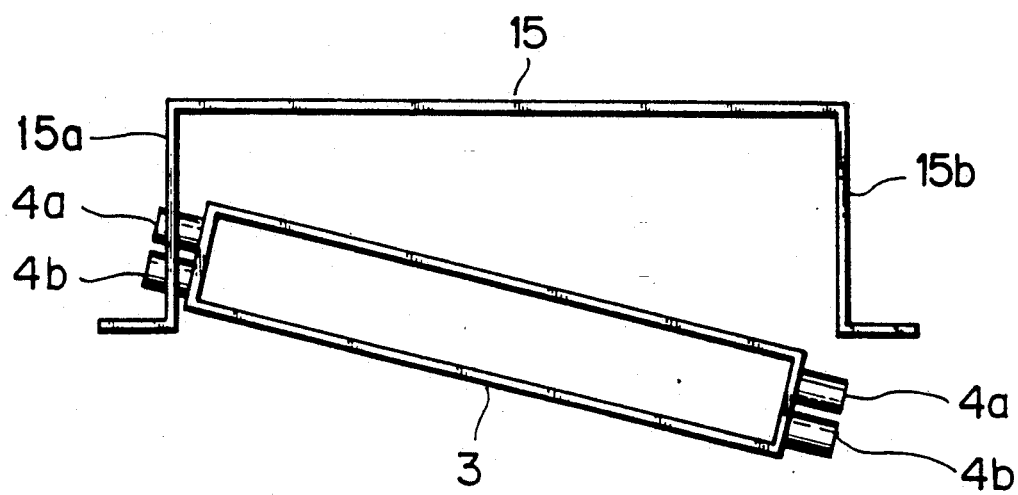
FIG. 3 illustrates how a cassette loading apparatus according to a second embodiment is assembled.

FIG. 3 illustrates a second embodiment of the invention. A frame 15 has side walls 15a and 15b and is formed with disengaging slots 12a and 12b in the bent portion 13 of one of side walls 15b and guiding slots 2 in the other side walls 15a which are the same as those of the prior art shown in FIG. 4. The assembly efficiency is slightly degraded as compared to the first embodiment but still much more improved than the prior art.

While the embodiments have been described by way of example of DAT (digital audio tape recorder), the present invention is also applicable to cassette loading apparatuses other than DAT.

What is claimed is:

1. A cassette holder mounting, comprising:
a frame having a U-shaped cross section and including opposed side walls;
a cassette holder having two oppositely positioned sides and including at least one guide pin projecting from each of said sides of said cassette holder; and
at least one L-shaped guide slot in each of said side walls, each of said guide slots including a horizontal slot leg, and a vertical slot leg extending downwardly from said horizontal slot leg, said vertical slot leg in one of said side walls extending downwardly to an edge of said one side wall to enable insertion of said guide pins into said guide slots and to thus enable mounting of said cassette holder between said opposed side walls, said cassette holder being thereby mounted between said side walls for repeated movement between a first position and a second position through movement of said guide pins along said horizontal and vertical slot legs.

2. A cassette holder mounting as claimed in claim 1, wherein said frame includes a bent portion extending outwardly from each of said side walls, and at least one disengaging slot in an intermediate portion of one of said bent portions, said disengaging slot being continuous with said vertical slot leg in said one side wall.

3. A cassette holder mounting as claimed in claim 2, wherein said vertical slot legs in both of said side walls extend downwardly to edges to said side walls, and wherein said vertical slot legs are continuous with disengaging slots in intermediate portions of both of said bent portions.

4. A cassette holder mounting as claimed in claim 1, wherein said vertical slot legs in both of said side walls extend downwardly to edges of said side walls.

5. A cassette holder mounting as claimed in claim 1, including a pair of guide pins projecting from each of said sides of said cassette holder, and a pair of L-shaped guide slots formed in each of said walls of said frame, and wherein the pair of L-shaped guide slots in said one side wall have vertical slot legs which extend downwardly to said edge of said one side wall.

* * * * *